Dec. 10, 1940.   J. J. SHIVELY ET AL   2,224,577
LIQUID FILTER
Filed Dec. 29, 1937   2 Sheets-Sheet 1

INVENTOR
John J. Shively.
BY Herbert H. Cudmore
ATTORNEY

Dec. 10, 1940.    J. J. SHIVELY ET AL    2,224,577
LIQUID FILTER
Filed Dec. 29, 1937    2 Sheets-Sheet 2
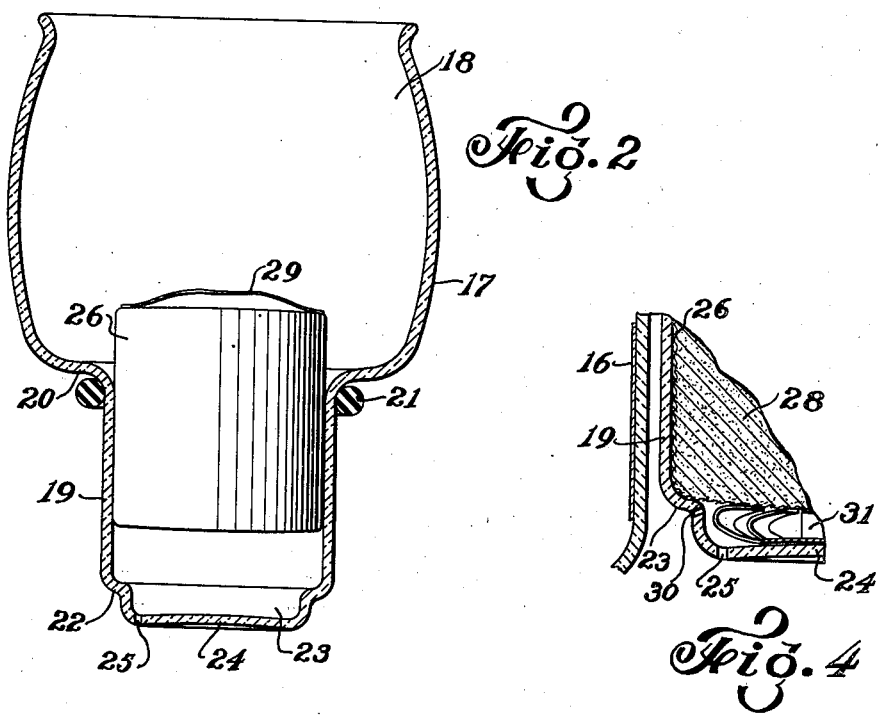
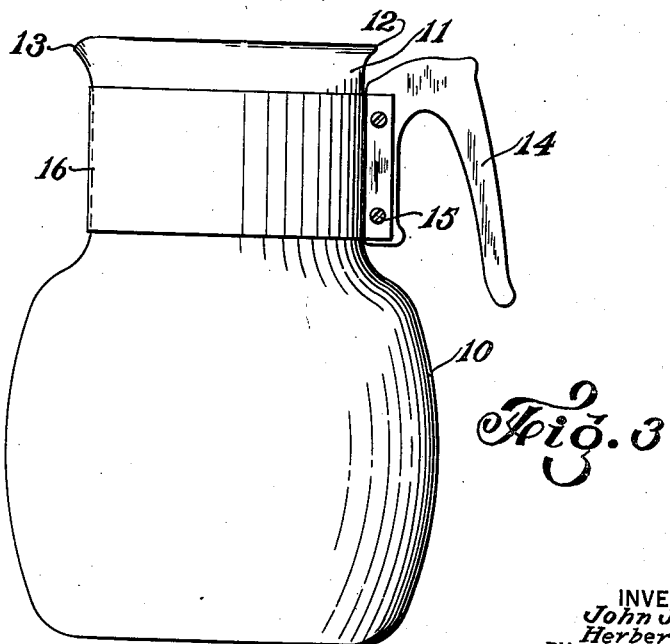
INVENTOR
John J. Shively.
Herbert H. Cudmore.
BY
ATTORNEY Patented Dec. 10, 1940

2,224,577

UNITED STATES PATENT OFFICE 2,224,577

LIQUID FILTER

John J. Shively and Herbert H. Cudmore, New York, N. Y., assignors to H. R. Van Deventer Inc., a corporation of New York Application December 29, 1937, Serial No. 182,199

1 Claim. (Cl. 210—105)

This invention pertains to improvements in liquid filters.

An object of the invention is to provide an improved liquid filter operable by gravity.

A further object is to provide a device of the above type adapted to remove from water undesirable tastes and odors, such as chlorine, etc., hitherto practically removable at the point of consumption only by pressure filters.

A further object is to provide a gravity filter of the above type which is simple, inexpensive and adapted to household use.

Another object is to provide a filter of the above type which may be constructed largely of glass.

A still further object is to provide an improved removable filter cartridge and means for combining the cartridge with its supporting structures.

Still another object is to provide a gravity filter of the above type having metering means to maintain proper speed of flow through the filtering material.

Other objects and advantages of the invention will appear during the course of the following description in connection with the accompanying drawings, in which Figure 1 is a vertical sectional view of the filter assembly;

Figure 2 is a vertical sectional view of the upper jar with the cartridge partially inserted;

Figure 3 is an exterior view of the receiver jar or pitcher; and

Figure 4 is a fragmental view of an alternative form of the drain sump structure.

Figure 1:
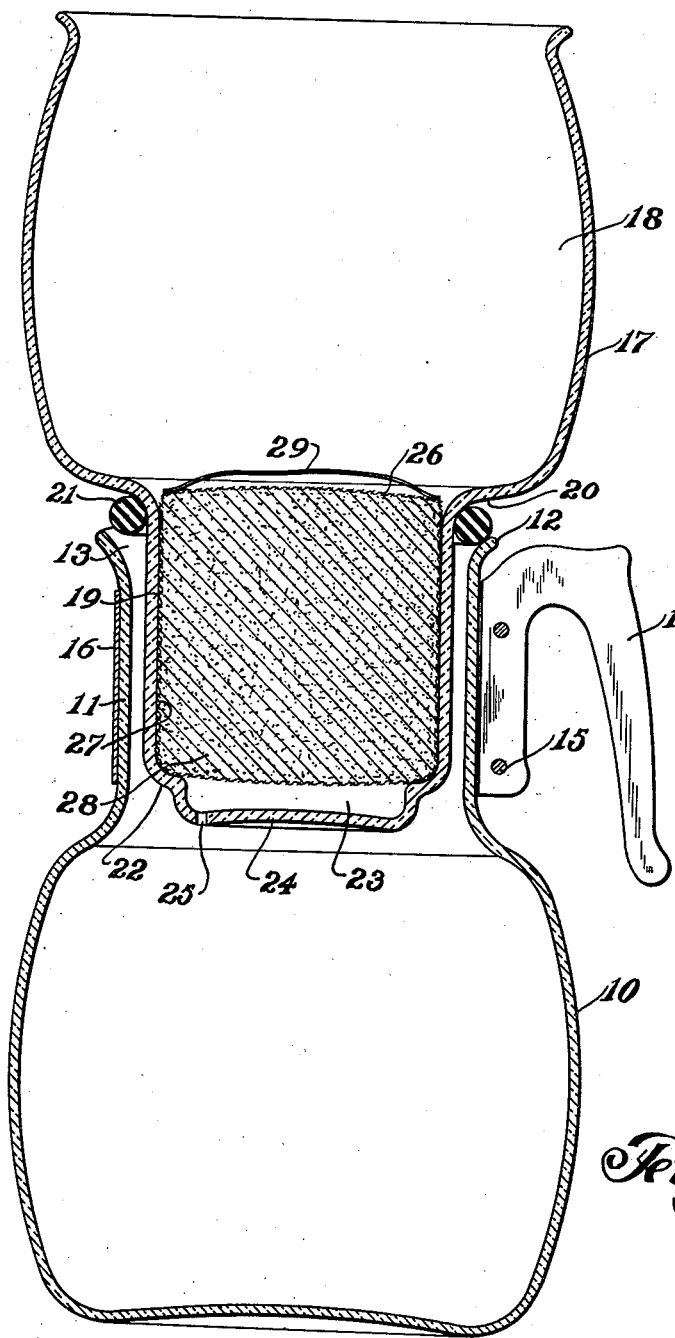

Referring to Figures 1 and 3, the numeral 10 designates a receiver jar, preferably shaped as a pitcher, having a cylindrical neck 11 terminating in an outwardly flared upper rim 12. The rim is formed with a lip 13 at one point in its circumference to facilitate pouring and to provide an air vent from the pitcher as hereinafter set forth. The pitcher may be provided with a suitable handle 14 secured by means of screws 15 to a band 16 encircling the neck 11.

The filter jar 17 comprises an upper, bowl-shaped portion 18 and a substantially cylindrical lower portion 19 adapted to fit loosely inside the neck 11 of the pitcher 10, as shown in Figure 1. The juncture of the bowl 18 and cylindrical portion 19 forms a shoulder 20 under which is disposed a resilient cushioning ring 21 adapted to engage the flared rim 12.

The lower end of the cylindrical portion 19 has an inwardly directed shoulder 22 encircling the top of a depressed sump 23 terminated by the bottom 24. The bottom 24 is preferably bulged upward in the center for reasons hereinafter set forth. In the form illustrated, the bottom is provided with a single outlet or metering hole 25, located at a point remote from the upwardly bulged center, but as also hereinafter explained, two or more holes may be provided.

A removable cartridge 26 of cylindrical shape is disposed in the cylindrical jar portion 19, being supported at the bottom on the shoulder 22. The cartridge comprises a porous cylindrical bag 27, preferably of thin fabric, charged with granular activated carbon 28 or other suitable filtering material. The cartridge may be provided with a loop or handle 29 to facilitate removal.

The operation of the device is as follows:

The cartridge 28, as manufactured and in a dry state, is of such size as to be slid readily down into the cylindrical portion 19 as shown in Figure 2, the filtering material 28 being somewhat loosely packed in the bag 27 and the diameter of the latter being such as to fit the cylindrical wall 19 without wrinkling.

The filter jar 17 is resiliently supported through the ring 21 by the pitcher 10 as shown in Figure 1. Liquid, for example water containing an objectionable percentage of chlorine, is poured into the bowl 18. The water penetrates and wets the cartridge 26, causing the charge of filtering material 28 to pack downward and swell slightly, pressing the surrounding bag 27 against 19 and thereby preventing leakage of water around the cartridge.

The water passes downward through the cartridge and enters the sump 23, thence flows through the small hole 25 into the pitcher 10. The grade of filtering material and mesh of the top and bottom of the bag are such as to normally allow the water to pass through with comparative freedom, but the speed of flow is retarded by the metering hole 25 which, by determining the rate of exit from the sump 23, keeps water descending through the cartridge only at proper speed to allow the material 28 to thoroughly adsorb the chlorine or other objectionable content of the water.

As the filtered water drains into the pitcher 10, the air from the latter vents upward between the inside of the neck 11 and the cylindrical jar portion 19, escaping under the ring 21 through the lip 13.

The charge of material 28, for example a high grade activated carbon, is sufficient to adsorb the chlorination from many water fillings of the bowl 18. Thus, for filtering drinking water or the like, the filter may be used many times with the cartridge remaining in place. When the cartridge finally becomes exhausted; that is, loaded with chlorine or other impurities removed from the water; the cartridge may be pulled out by means of the loop 29 and replaced by a fresh cartridge. If at any time during the life of the cartridge it may be desirable to remove it, for instance to wash the bowl 18, of course this may also be done by means of the loop 29 as described.

As previously pointed out, the hole 25 is preferably located at a point near the outer circumference of the bottom 24, and the latter is preferably bulged upward in the center. By this structure, in the extreme case of the cartridge being pushed down hard enough to cause its bottom to bulge far down into the sump, the hole cannot be blocked, since even if the cartridge should be bulged down far enough to touch the upwardly bulged middle of the bottom it will be supported by the latter, leaving a substantially annular space around the inside of sump 23 in communication with the hole 25.

As one alternative combination, any desired supporting structure, illustrated by the spider 31, Figure 5, or the like, may be placed under the cartridge 21.

If desired, a very small bleeder hole 30 may be provided near the top of the sump 23 to quickly vent any air bubbles which may be trapped therein. Also, instead of the single metering hole 25, a plurality of smaller holes of the same total delivery capacity may be provided.

From the foregoing description it is evident that the device, while of simple construction, provides an effective means of filtering liquids by gravity, the flow being controlled so as to permit effective removal of the impurities without undue loss of time. No tight inlet and outlet connections are required, as in the case of pressure filters.

The parts are of such form as to be readily cleaned, and except for the replaceable cartridge, there are no internal parts in the preferred form. All such ordinary filter parts as screens, which may be unsanitary, difficult and liable to become lost, are eliminated in the preferred form of the present invention. Due to the structure by which the cartridge expands to seal itself in the filter jar, no fastening is required therefor. The upper jar and the pitcher are preferably made of glass, as previously stated, but it is obvious that they may be made of any other suitable sanitary material.

The resilient ring 21 provides a resilient support for the jar 17 and prevents breakage through carelessness in clashing the parts together when placing the jar in position. It will be seen that the receiver 10 constitutes a convenient pitcher from which to serve water after it has been filtered.

The upwardly bulged center of the bottom 24 allows the jar to readily stand on a flat surface when not in use in the pitcher.

While the device has been described in preferred form, it is not limited to the precise structures illustrated, as various modifications may be made without departing from the scope of the appended claim.

What is claimed is:

In a portable water treating device, in combination, a container for receiving the treated water, comprising a pitcher having a body portion, a cylindrical neck portion smaller in diameter than said body portion and terminating in an outwardly flared rim, said rim being deformed at one point to form a pouring lip when water is to be used from said container and forming an air vent when the container is receiving treated water, a handle for said container secured to said neck portion, a receptacle removably carried by said container for receiving the raw water to be treated comprising, a jar having a cylindrical lower portion of reduced diameter and extending into the interior of said neck, means integral with said cylindrical portion forming an annular shoulder therein adjacent to the bottom thereof, a wall formed integral with and forming a bottom for said cylindrical lower portion, said bottom being convexed upwardly, a hole formed in said bottom and spaced apart from the center thereof, and a filter cartridge positioned in said cylindrical lower portion and held in spaced relation to said convexed bottom by said annular shoulder.

JOHN J. SHIVELY.
HERBERT H. CUDMORE.